US011339969B2

(12) United States Patent
Asai et al.

(10) Patent No.: US 11,339,969 B2
(45) Date of Patent: May 24, 2022

(54) GAS TURBINE COMBUSTOR

(71) Applicant: Mitsubishi Power, Ltd., Yokohama (JP)

(72) Inventors: Tomohiro Asai, Tokyo (JP); Shohei Yoshida, Yokohama (JP); Yoshitaka Hirata, Yokohama (JP); Akinori Hayashi, Yokohama (JP); Yasuhiro Akiyama, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 17/036,575

(22) Filed: Sep. 29, 2020

(65) Prior Publication Data
US 2021/0095850 A1 Apr. 1, 2021

(30) Foreign Application Priority Data
Oct. 1, 2019 (JP) .............................. JP2019-181142

(51) Int. Cl.
*F23R 3/46* (2006.01)
*F23R 3/28* (2006.01)
*F23R 3/34* (2006.01)

(52) U.S. Cl.
CPC .............. *F23R 3/286* (2013.01); *F23R 3/343* (2013.01); *F05D 2240/35* (2013.01);
(Continued)

(58) Field of Classification Search
CPC ............... F23R 3/286; F23R 3/04; F23R 3/10
See application file for complete search history.

(56) References Cited

U.S. PATENT DOCUMENTS

| 4,100,733 A | * | 7/1978 | Striebel | F23R 3/286 239/419.3 |
| 8,438,851 B1 | * | 5/2013 | Uhm | F23R 3/04 60/737 |

(Continued)

FOREIGN PATENT DOCUMENTS

| DE | 10 2013 204 307 A1 | 9/2014 |
| JP | 2003-148734 A | 5/2003 |
| WO | WO 2018/199289 A1 | 11/2018 |

OTHER PUBLICATIONS

German-language Office Action issued in German Application No. 10 2020 212 361.6 dated Jan. 24, 2022 with partial English translation (11 pages).

*Primary Examiner* — Gerald L Sung
(74) *Attorney, Agent, or Firm* — Crowell & Moring LLP

(57) ABSTRACT

Adhesion of particulate matters to the burner accompanying combustion in a lean-combustion gas turbine combustor is suppressed, and the structural reliability is improved. In a gas turbine combustor including: a tubular liner that forms a combustion chamber; and a burner including an air hole plate that is arranged at an inlet of the liner and includes a plurality of air holes for guiding compressed air to the combustion chamber, and a plurality of fuel nozzles that are arranged on a side opposite to the combustion chamber with the air hole plate being sandwiched therebetween, the plurality of fuel nozzles each injecting a fuel toward a corresponding air hole, the air holes and the fuel nozzles forming a plurality of concentric annular lines, a plurality of small holes having opening diameters smaller than those of the air holes are provided through the air hole plate such that the plurality of small holes are positioned in an inner area of an innermost annular line of the air holes.

7 Claims, 9 Drawing Sheets

(52) U.S. Cl.
CPC ............... *F23D 2900/00008* (2013.01); *F23N 2241/20* (2020.01); *F23R 3/46* (2013.01); *F23R 2900/03043* (2013.01); *F23R 2900/03343* (2013.01)

(56) References Cited

U.S. PATENT DOCUMENTS

| | | | | |
|---|---|---|---|---|
| 11,079,113 | B2* | 8/2021 | Tada | ........................ F23R 3/283 |
| 2004/0011054 | A1* | 1/2004 | Inoue | ........................ F23R 3/28 |
| | | | | 60/776 |
| 2013/0029277 | A1* | 1/2013 | Koizumi | ................. F23R 3/343 |
| | | | | 431/354 |
| 2013/0104552 | A1* | 5/2013 | Uhm | .................... F23M 20/005 |
| | | | | 60/738 |
| 2013/0227953 | A1* | 9/2013 | Uhm | ........................ F23R 3/002 |
| | | | | 60/772 |
| 2016/0018109 | A1 | 1/2016 | Beck et al. | |
| 2017/0234538 | A1* | 8/2017 | Park | ........................... F23R 3/04 |
| | | | | 60/751 |
| 2019/0128527 | A1* | 5/2019 | Cho | ........................... F23R 3/12 |
| 2021/0102703 | A1 | 4/2021 | Tada et al. | |

* cited by examiner

GAS TURBINE COMBUSTOR

BACKGROUND OF THE INVENTION

1. Field of the Invention

The present invention relates to a gas turbine combustor.

2. Description of the Related Art

At thermal power plants, it is demanded to improve power generation efficiency for reducing emissions of carbon dioxide ($CO_2$), which are a cause of global warming. An effective measure for improvement of the power generation efficiency of a gas turbine power plant is heating up combustion gas generated at a gas turbine combustor to a high temperature. However, heating up the combustion gas to a high temperature is accompanied by a technical problem related to suppression of emissions of nitrogen oxides (NOx) as a pollutant.

Typically, combustion methods of gas turbine combustors are roughly classified into diffusion combustion and premixed combustion.

In the diffusion combustion, fuel is directly injected into a combustion chamber and then mixed with air in the combustion chamber. Therefore, a flashback toward the upstream of the combustion chamber, and autoignition in fuel supply flow passages are less likely occur. Thus, the diffusion combustion provides good combustion stability. On the other hand, in the diffusion combustion, since flames are formed in areas where air is mixed with fuel in a ratio required for complete combustion of the fuel (stoichiometric mixing ratio), high temperature flames are locally generated. Because a large amount of NOx is generated in the local high temperature areas, it is necessary to reduce NOx emissions by injecting an inert medium such as water, steam or nitrogen. This necessitates power for an auxiliary machine that supplies the inert medium, leading to deterioration of the power generation efficiency.

In the premixed combustion, fuel and air are premixed with each other and then supplied to a combustion chamber, and NOx emissions are small because the fuel can be combusted in a lean mixture. On the other hand, in heating up the combustion gas to a high temperature, if the combustion air temperature is raised, and the fuel concentration in a premixer is increased, the risk of flashback toward the upstream of the combustion chamber increases. This generates concern about damages caused by backfire to the structure of the combustor.

In view of this, there is a known lean-combustion combustor aimed for NOx emission reduction and flashback prevention by enhancing fuel dispersion and preventing local formation of high temperature flame, as disclosed in JP-2003-148734-A (Patent Document 1), for example.

CITATION LIST

Patent Documents

Patent Document 1: JP-2003-148734-A

A burner disclosed in JP-2003-148734-A includes a large number of pairs of fuel nozzles and air holes. The air holes are arranged concentrically on an air hole plate. A central section of concentric circles formed by the air holes on the front surface of the air hole plate facing a combustion chamber is a wall surface without air holes, and particulate matters accompanying combustion adhere to the wall surface in some cases. There is a possibility that the burner overheats if the particulate matters adhered onto the air hole plate are ignited, and further, there is a possibility of damages to downstream structures if the particulate matters fall off.

An object of the present invention is to provide a lean-combustion gas turbine combustor that can suppress adhesion, to a burner, of particulate matters accompanying combustion, and can improve the structural reliability.

SUMMARY OF THE INVENTION

In order to achieve the object described above, according to the present invention, in a gas turbine combustor including: a tubular liner that forms a combustion chamber; and a burner including an air hole plate that is arranged at an inlet of the liner and includes a plurality of air holes for guiding compressed air to the combustion chamber, and a plurality of fuel nozzles that are arranged on a side opposite to the combustion chamber with the air hole plate being sandwiched therebetween, the plurality of fuel nozzles each injecting a fuel toward a corresponding air hole, the air holes and the fuel nozzles forming a plurality of concentric annular lines, a plurality of small holes having opening diameters smaller than opening diameters of the air holes are provided through the air hole plate such that the plurality of small holes are positioned in an inner area of an innermost annular line of the air holes.

According to the present invention, it is possible to suppress adhesion of particulate matters to a burner accompanying combustion in a lean-combustion gas turbine combustor, and to improve the structural reliability.

DESCRIPTION OF THE PREFERRED EMBODIMENTS

In the following, embodiments of the present invention are explained by using the drawings.

First Embodiment

—Gas Turbine Power Plant—

Figure 1:
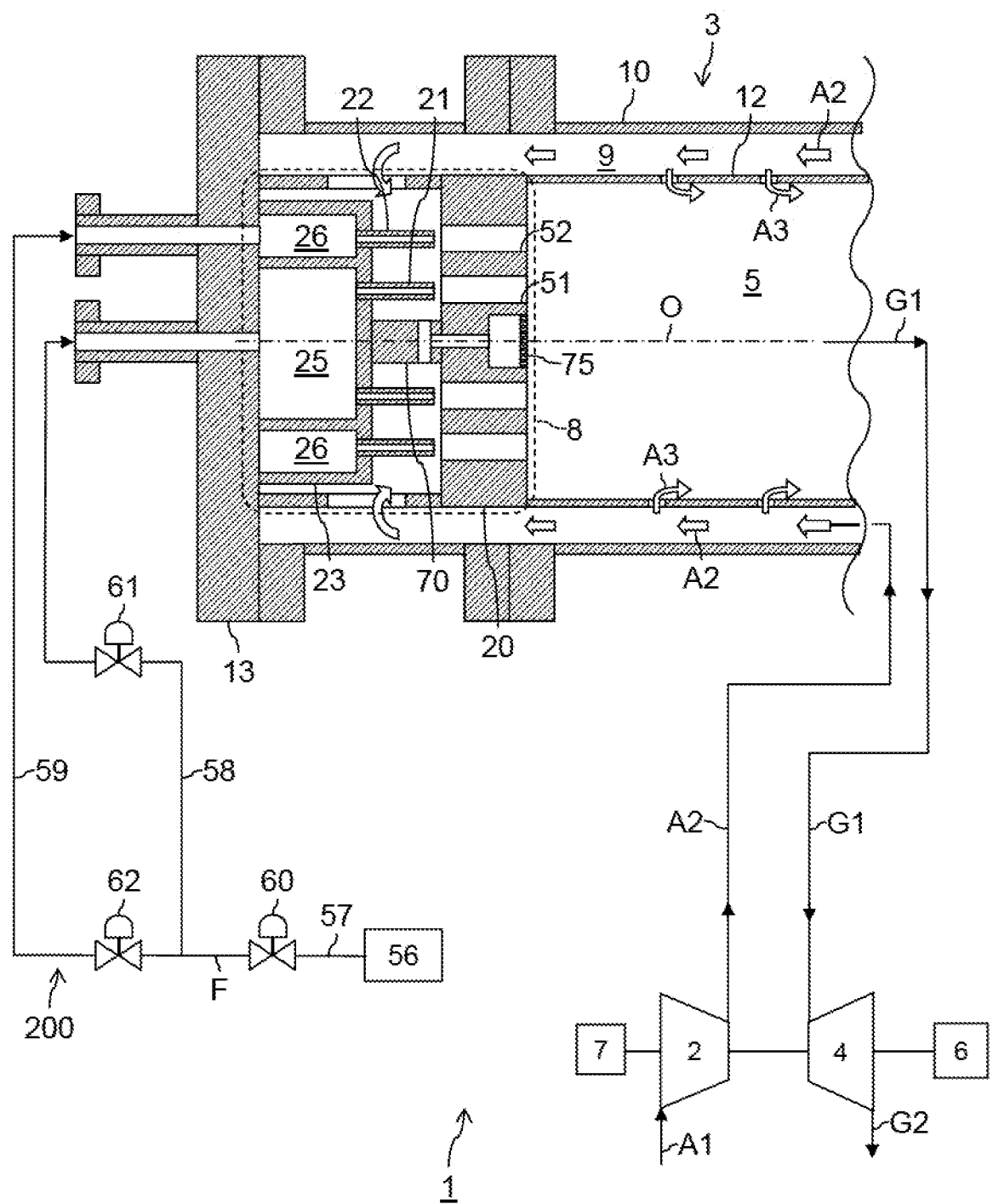
FIG. 1 is a schematic configuration diagram of a gas turbine power plant including a gas turbine combustor according to a first embodiment of the present invention.
Figure 2:
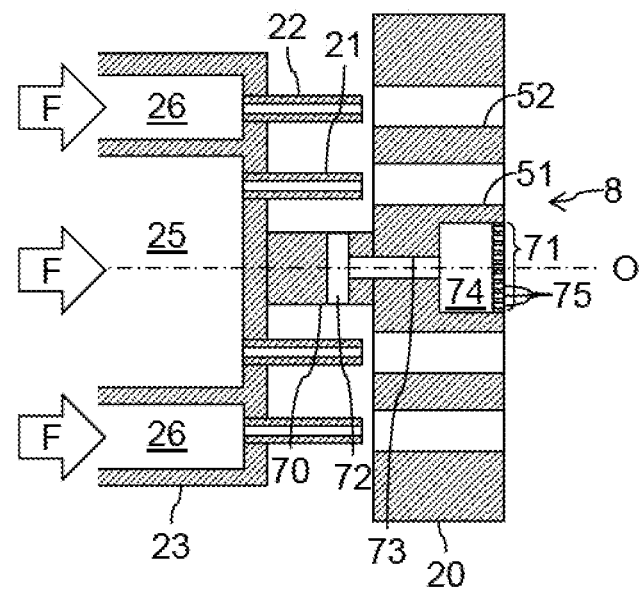
FIG. 2 is a cross-sectional view that represents the configuration of main sections of a burner provided to the gas turbine combustor according to the first embodiment of the present invention, and includes the central axis of the burner.
Figure 3:
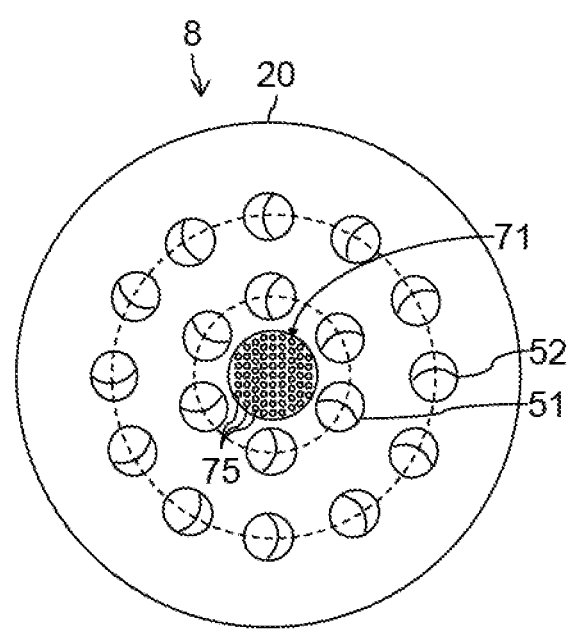
FIG. 3 is a figure of the burner provided to the gas turbine combustor according to the first embodiment of the present invention as seen from a combustion chamber.

FIG. 1 is a schematic configuration diagram of a gas turbine power plant including a gas turbine combustor according to a first embodiment of the present invention. FIG. 2 is a cross-sectional view that represents the configuration of main sections of a burner provided to the gas turbine combustor according to the first embodiment of the present invention, and includes the central axis of the burner. FIG. 3 is a figure of the burner provided to the gas turbine combustor according to the first embodiment of the present invention as seen from a combustion chamber.

A gas turbine power plant 1 includes an air compressor 2, a gas turbine combustor (hereinafter, referred to as a combustor for short) 3, a turbine 4 and a generator 6. The air compressor 2 sucks and compresses air A1, and supplies compressed air A2 to the combustor 3. The combustor 3 mixes the compressed air A2 and a gaseous fuel F together, combusts the mixture, and generates a combustion gas G1. The turbine 4 is driven by the combustion gas G1 generated at the combustor 3, and the combustion gas G1 that has driven the turbine 4 is emitted as an exhaust gas G2. The generator 6 is driven by the rotational motive power of the turbine 4, and generates power. Note that the gas turbine is driven by a startup motor 7 only at the beginning of startup.

—Gas Turbine Combustor—

The combustor 3 is attached to a casing (not illustrated) of the gas turbine, and includes a liner (inner cylinder) 12, a flow sleeve (outer cylinder) 10, a burner 8 and a fuel supplying system 200. The liner 12 is a cylindrical member, and forms a combustion chamber 5 there inside. The flow sleeve 10 is a cylindrical member that has an internal diameter larger than the diameter of the liner 12, and surrounds the outer circumference of the liner 12. The flow sleeve 10 forms a cylindrical air flow passage 9 between itself and the liner 12. An end section of the flow sleeve 10 on the side opposite to the turbine 4 (the left side in FIG. 1) is closed off by an end cover 13. The compressed air A2 from the air compressor 2 flows in a direction away from the turbine 4 through the air flow passage 9 formed on the outer circumference of the liner 12 by the flow sleeve 10, and the outer circumferential surface of the liner 12 is subjected to convection cooling by the compressed air A2 flowing through the air flow passage 9. Additionally, a large number of holes are formed through the wall surface of the liner 12. A part A3 of the compressed air A2 flowing through the air flow passage 9 passes through those holes to flow into the combustion chamber 5, and the inner circumferential surface of the liner 12 is subjected to film cooling by the part A3 of the compressed air A2. Further, the compressed air A2 having passed through the air flow passage 9 and reached the burner 8 is spouted out to the combustion chamber 5 together with the gaseous fuel F supplied from the fuel supplying system 200 to the burner 8, and the gaseous fuel F is combusted. In the combustion chamber 5, the mixture of the compressed air A2 and the gaseous fuel F is combusted to generate the combustion gas G1. The combustion gas G1 is supplied to the turbine 4 via a combustor transition piece (not illustrated).

As illustrated in FIG. 1, the only one burner 8 is arranged at the inlet (the opening at an end section on the side opposite to the turbine 4) of the liner 12, and includes an air hole plate 20, fuel nozzles 21 and 22 and a fuel distributor (fuel header) 23.

The air hole plate 20 is a circular plate coaxial with the liner 12, is arranged at the inlet (the opening at the end section on the side opposite to the turbine 4) of the liner 12, and is supported by the fuel distributor 23 via a plate support 70 as illustrated in FIG. 1 in the present embodiment. The air hole plate 20 includes a plurality of air holes 51 and 52 that guide the compressed air A2 to the combustion chamber 5. The plurality of air holes 51 and 52 form a plurality of concentric annular lines (two concentric annular lines in the present example) having their center on the central axis O of the liner 12. The air holes 51 belong to the first (innermost) annular line, and the air holes 52 belong to the second (outermost) annular line. In the present embodiment, the air holes 51 and 52 are provided at swirl angles, and the outlet of each hole is shifted toward one side in the circumferential direction relative to the inlet of the hole.

The fuel nozzles 21 and 22 are supported by the fuel distributor 23, and are arranged on a side opposite to the combustion chamber 5 with the air hole plate 20 being sandwiched therebetween. The numbers and positions of the fuel nozzles 21 and 22 correspond to the numbers and positions of the air holes 51 and 52 (one fuel nozzle corresponds to one air hole), and the fuel nozzles 21 and 22 form, together with the air holes 51 and 52, a plurality of concentric annular lines (two lines in the present example) having their center on the central axis O of the liner 12. The fuel nozzles 21 belong to the first (innermost) annular line, and the fuel nozzles 22 belong to the second (outermost) annular line. The fuel nozzles 21 and 22 have injection ports opening toward the inlets of corresponding air holes, and inject the gaseous fuel F toward those corresponding air holes. By causing the fuel to be injected from a large number of fuel nozzles to corresponding air holes in this way, coaxial jets of the fuel and air, in which the circumference of a fuel flow is covered by an air flow, are injected dispersedly from each air hole to the combustion chamber 5.

Note that due to differences in circumference between the annular lines, outer annular lines have larger numbers of fuel nozzles and air holes. That is, the numbers of the fuel nozzles 21 and air holes 51 in the first (innermost) line (the six fuel nozzles 21, and the six air holes 51 in the example illustrated in FIG. 3) are smaller than the numbers of the fuel nozzles 22 and air holes 52 in the second (outermost) line (the twelve fuel nozzles 22, and the twelve air holes 52 in the example illustrated in FIG. 3).

The fuel distributor 23 is a member that supplies the fuel separately to the fuel nozzles 21 and 22, and includes a plurality of fuel cavities 25 and 26 thereinside. The fuel cavities 25 and 26 are spaces that play a role of supplying the gaseous fuel F separately to a plurality of fuel nozzles belonging to corresponding annular lines. The fuel cavity 25 is formed to have a columnar shape on the central axis O of the liner 12, and the fuel cavity 26 is formed to have a cylindrical shape such that the fuel cavity 26 surrounds the outer circumference of the fuel cavity 25. In the present embodiment, each fuel nozzle 21 is connected to the fuel cavity 25, and each fuel nozzle 22 is connected to the fuel cavity 26. When the gaseous fuel F is supplied to the fuel cavity 25, the gaseous fuel F is distributed to each fuel nozzle 21 arranged in the inner annular line and then spouted out, and the gaseous fuel F having been spouted out from the fuel nozzle 21 is spouted out together with the compressed air A2 from each air hole 51 to the combustion chamber 5. When the gaseous fuel F is supplied to the fuel cavity 26, the gaseous fuel F is distributed to each fuel nozzle 22 arranged in the outer annular line and then spouted out, and the gaseous fuel F having been spouted out from the fuel nozzle 22 is spouted out together with the compressed air A2 from the air holes 52 to the combustion chamber 5.

Here, the burner 8 according to the present embodiment includes a cavity 74, a plurality of small holes 75 and air flow passages 72 and 73. The cavity 74 is a space formed inside the air hole plate 20 in order to supply the compressed air A2 separately to the plurality of (a large number of) small holes 75, and is formed in a columnar shape at a central section of the annular lines of the air holes 51 and 52 (on the central axis O of the air hole plate 20 in the present embodiment).

The plurality of small holes 75 are gas injection holes linking the cavity 74 and the combustion chamber 5, and opened through the front surface (a surface facing the combustion chamber 5) of the air hole plate 20. The number of the small holes 75 is larger than the total number of the air holes 51 and 52 in the present embodiment, and the opening diameter of each small hole 75 is sufficiently smaller than the opening diameters of the air holes 51 and 52. The small holes 75 are provided densely in an inner area 71 of the innermost annular line of air holes (i.e. the air holes 51). As illustrated in FIG. 1 to FIG. 3, in the present embodiment, the inner area 71 on the front surface of the air hole plate 20 is formed with a lid-like circular plate closing off the cavity 74, and all the small holes 75 are formed through this circular plate. Although the small holes 75 can be provided at swirl angles in a manner similar to that for the air holes 51 and 52, it is preferable not to provide them at swirl angles, and, in the present embodiment, all the small holes 75 are formed to be parallel to the central axis O of the liner 12.

The air flow passages 72 and 73 are passages that guide a gas (the compressed air A2 in the present embodiment) to the plurality of small holes 75, and are connected to the plurality of small holes 75 via the cavity 74. Specifically, the air flow passage 72 penetrates the plate support 70 in a direction crossing the central axis O of the liner 12, and is opened to a space that is between the air hole plate 20 and the fuel distributor 23, and is filled with the compressed air A2. The air flow passage 73 extends along the central axis O inside the plate support 70 and the air hole plate 20, and connects the air flow passage 72 with the cavity 74. Thereby, the compressed air A2 is guided to the cavity 74 via the air flow passages 72 and 73, and the compressed air A2 having been introduced into the cavity 74 is spouted out separately from each small hole 75 to the combustion chamber 5. Note that, other than the small holes 75, only the air flow passage 73 is connected to the cavity 74 in the present embodiment, and only the compressed air A2 is spouted out from the small holes 75 to the combustion chamber 5.

The fuel supplying system 200 includes a fuel supplying source 56, a main flow pipeline 57, branch pipelines 58 and 59, a fuel shut valve 60 and fuel flow control valves 61 and 62. The main flow pipeline 57 extends from the fuel supplying source 56, and the main flow pipeline 57 branches into the two branch pipelines 58 and 59. The branch pipeline 58 is connected to the fuel cavity 25, and the branch pipeline 59 is connected to the fuel cavity 26. The fuel shut valve 60 is provided on the main flow pipeline 57, the fuel flow control valve 61 is provided on the branch pipeline 58, and the fuel flow control valve 62 is provided on the branch pipeline 59. By opening the fuel shut valve 60, the gaseous fuel F starts being supplied to the branch pipelines 58 and 59, and by closing the fuel shut valve 60, the supply of the gaseous fuel F to the branch pipelines 58 and 59 is shut off. The fuel flow control valves 61 and 62 play a role of controlling the flow rates of the fuel flowing through the branch pipelines 58 and 59 in accordance with their openings, and the flows of the fuel through the branch pipelines 58 and 59 can also be shut off by fully closing the fuel flow control valves 61 and 62. For example, by opening the fuel shut valve 60, and increasing the opening of the fuel flow control valve 61 from its fully closed state, the supply flow rate of the fuel to the fuel cavity 25 is increased, and the amount of fuel-injection from the fuel nozzles 21 is increased, which in turn increases the fuel-air ratio of coaxial jets spouted out from the air holes 51. Similarly, by increasing the opening of the fuel flow control valve 62 from its fully closed state, the supply flow rate of the fuel to the fuel cavity 26 is increased, and the amount of fuel-injection from the fuel nozzles 22 is increased, which in turn increases the fuel-air ratio of coaxial jets spouted out from the air holes 52.

Note that as the gaseous fuel F supplied from the fuel supplying source 56, other than natural gas which is a typical gas turbine fuel, a petroleum gas or a gas containing hydrogen or carbon monoxide like a coke oven gas, a refinery off-gas, a coal-derived gas or the like can be used.

Comparative Example

Figure 4:
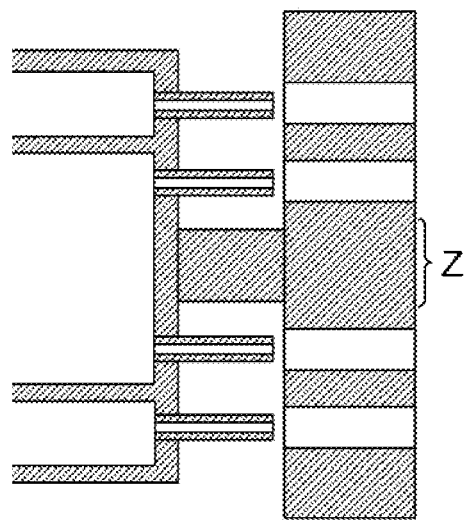
FIG. 4 is a cross-sectional view of a conventional burner including the central axis thereof.
Figure 5:
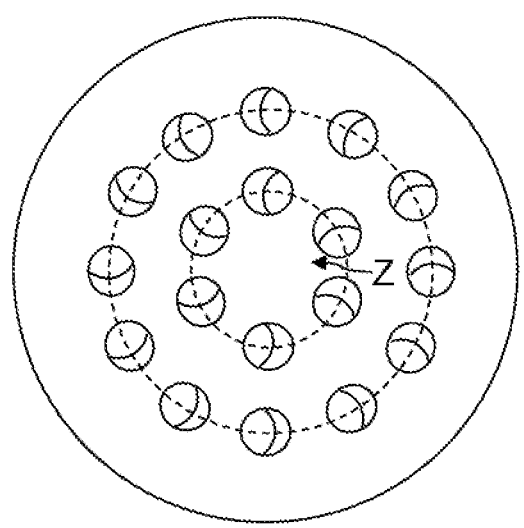
FIG. 5 is a figure of the conventional burner as seen from a combustion chamber.

For comparison, a cross-sectional view of a conventional burner including the central axis thereof is illustrated in FIG. 4, and a figure of the conventional burner as seen from a combustion chamber is illustrated in FIG. 5. Similar to the present embodiment, these figures illustrate, as an example, a burner having a plurality of air holes and fuel nozzles arranged in two concentric annular lines, but the conventional burner does not have elements equivalent to the small holes 75, the air flow passages 72 and 73 and the cavity 74 of the present embodiment. An inner area Z of an innermost annular line of air holes in an air hole plate forms a wall surface that faces the combustion chamber.

Figure 6:
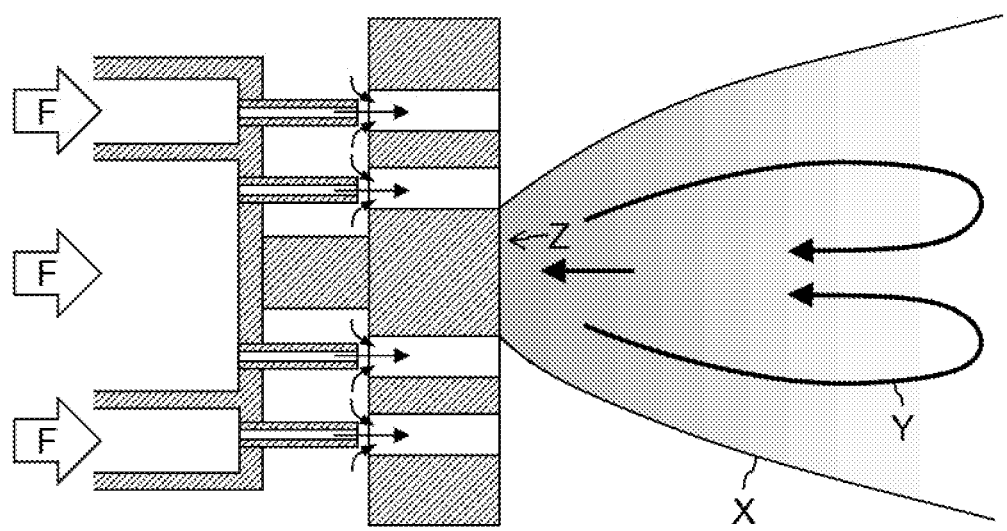
FIG. 6 is a figure for explaining the mechanism of adhesion, onto an inner area Z, of particulate matters generated along with combustion in the conventional burner.

The mechanism of adhesion, onto the inner area Z, of particulate matters generated along with combustion in the conventional burner is explained with reference to FIG. 6. The figure schematically illustrates a flame X and a recirculation flow Y formed by the burner. By the recirculation flow Y being formed at a middle section located downstream of the burner, a combustion gas returns to the upstream side.

Due to the heat of the combustion gas, the mixture of the gaseous fuel and air is ignited to form the stable flame X. Due to thermal decomposition of the fuel under a fuel-rich condition or a high-temperature condition, particulate matters originate from the carbon component of hydrocarbons such as methane or propane contained in the fuel. These particulate matters follow the recirculation flow Y, return to the middle of the burner, and adhere onto the inner area Z of the innermost annular line of air holes of the air hole plate. There is a fear that the burner overheats if the adhered particulate matters are combusted, and there is concern about damages to downstream structures if the particulate matters fall off.

—Effects—

Figure 7:
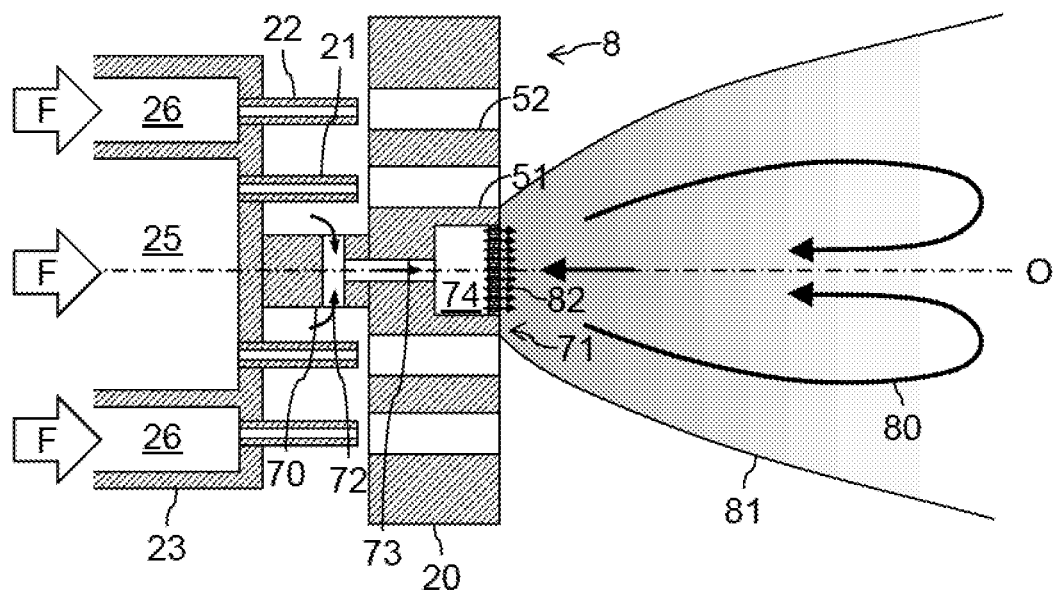
FIG. 7 is a figure for explaining the mechanism of suppression of adhesion of particulate matters to the burner in the present invention.

(1) The mechanism of suppression of adhesion of particulate matters to the burner in the present embodiment is explained with reference to FIG. 7. As illustrated in the figure, in the present embodiment, the compressed air A2 flows in from the air flow passage 72 provided through the plate support 70, and the compressed air A2 is spouted out from a large number of the small holes 75 to the combustion chamber 5 via the air flow passage 73 and the cavity 74. Jets 82 formed by the compressed air A2 blow away particulate matters that come flying following the recirculation flow 80, and suppress adhesion of the particulate matters to the inner area 71. By suppressing adhesion of particulate matters to the burner 8, it is possible to mitigate the concern about overheating of the burner 8 due to combustion of particulate matters, and damages to downstream structures due to particulate matters that may otherwise fall off from the inner area 71. In this manner, according to the present embodiment, it is possible to suppress adhesion of particulate matters to the burner 8 accompanying combustion in a lean-combustion gas turbine combustor, and to improve the structural reliability.

(2) In the present embodiment, the configuration is a simple one in which a part of the compressed air A2 is caused to flow through a bypass passage and to be spouted out from the small holes 75, and the energy efficiency is good because a fuel is not used for formation of the jets 82.

(3) If the small holes 75 are provided at swirl angles, the jets 82 may have swirling components, and form a circulating flow, but the small holes 75 extend in parallel to the central axis O of the liner 12, and the jets 82 actively flow to the downstream side in the configuration in the present embodiment; as a result, it is possible to move particulate matters to the downstream side efficiently.

Second Embodiment

—Configuration—

Figure 8:
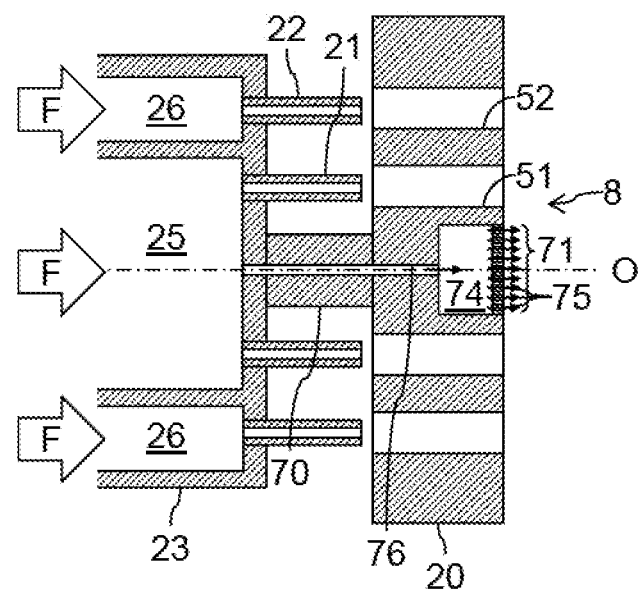
FIG. 8 is a cross-sectional view that represents the configuration of main sections of the burner provided to the gas turbine combustor according to a second embodiment of the present invention, and includes the central axis of the burner.

FIG. 8 is a cross-sectional view that represents the configuration of main sections of the burner provided to the gas turbine combustor according to a second embodiment of the present invention, and includes the central axis of the burner. FIG. 8 corresponds to FIG. 2 illustrating the first embodiment. Elements in FIG. 8 that are similar to their counterparts in the first embodiment are given the same reference signs as those in FIG. 2, and explanation thereof is omitted.

A difference of the present embodiment from the first embodiment is that a fuel flow passage 76 connected to the plurality of small holes 75 is provided. The air flow passages 72 and 73 of the first embodiment are not included in the present embodiment, but the cavity 74 is connected to the fuel cavity 25 via the fuel flow passage 76. The fuel flow passage 76 extends along the central axis O inside the plate support 70 and the air hole plate 20. Thereby, the gaseous fuel F is guided to the cavity 74 via the fuel flow passage 76, and the gaseous fuel F having been introduced into the cavity 74 is spouted out separately from each small hole 75 to the combustion chamber 5. Note that, other than the small holes 75, only the fuel flow passage 76 is connected to the cavity 74 in the present embodiment, and only the gaseous fuel F is spouted out from the small holes 75 to the combustion chamber 5.

A part of the gaseous fuel F supplied to the fuel nozzles 21 is spouted out from the small holes 75, and the flow rate distribution of the gaseous fuel F to be spouted out from each of the fuel nozzles 21 and the small holes 75 can be controlled by changing the flow passage areas (e.g. the orifice diameters) of the fuel nozzles 21 and the small holes 75 (or the fuel flow passage 76). It should be noted however that the opening diameters of the small holes 75 to be set are limited in accordance with the pressure fluctuation range (design values) of the cavity 74 such that the fuel-air ratio of the gaseous fuel F to be spouted out from the small holes 75 near the inner area 71 does not become a ratio in the flammability range (flammability limit) in order to avoid ignition of the gaseous fuel F spouted out from the small holes 75. Although the opening diameters of the small holes 75 are desirably set so as to limit the flow rate of the spouted fuel such that the fuel-air ratio does not reach the lower limit of the flammability limit (the fuel-air ratio is always kept lower than the lower limit) even if the pressure in the cavity 74 becomes the highest pressure, the fuel-air ratio is always kept above the upper limit of the flammability range in a possible configuration in some cases. In addition, in another possible configuration, a dedicated branch pipeline (fuel pipeline) that supplies the gaseous fuel F to the fuel flow passage 76, and a fuel flow control valve provided on the dedicated branch pipeline are added, and it is made possible to control the flow rate of the gaseous fuel F to be spouted out from the small holes 75 separately from the amount of the fuel supply to the fuel nozzles 21 and 22.

In other respects than those explained above, the present embodiment is similar to the first embodiment.

—Effects—

In the present embodiment, the gaseous fuel F spouted out from the small holes 75 to the combustion chamber 5 blows away particulate matters to suppress adhesion of the particulate matters to the burner 8. Thereby, in the present embodiment also, the effect (1) can be attained similarly to the first embodiment. In addition, the effect (3) can also be attained similarly to the first embodiment because the configuration of the small holes 75 is the same as that in the first embodiment.

Third Embodiment

—Configuration—

Figure 9:
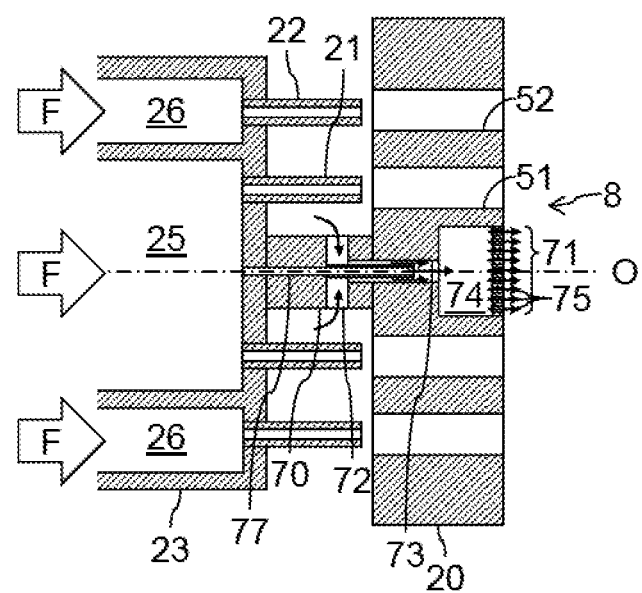
FIG. 9 is a cross-sectional view that represents the configuration of main sections of a burner provided to the gas turbine combustor according to a third embodiment of the present invention, and includes the central axis of the burner.

FIG. 9 is a cross-sectional view that represents the configuration of main sections of the burner provided to the gas turbine combustor according to a third embodiment of the present invention, and includes the central axis of the burner. FIG. 9 corresponds to FIG. 2 illustrating the first embodiment. Elements in FIG. 9 that are similar to their counterparts in the first embodiment are given the same reference signs as those in FIG. 2, and explanation thereof is omitted.

A difference of the present embodiment from the first embodiment is that, in addition to the air flow passages 72 and 73 connected to the plurality of small holes 75, a fuel flow passage 77 connected to the small holes 75 is provided. The fuel flow passage 77 extends along the central axis O inside the plate support 70, opens at an intermediate section of the air flow passage 73, and connects the fuel cavity 25 with the air flow passage 73. Thereby, a part of the gaseous fuel F is guided to the air flow passage 73 from the fuel cavity 25 via the fuel flow passage 77, and a mixture of the gaseous fuel F and the compressed air A2 is guided to the cavity 74 via the air flow passage 73. The mixture having been introduced into the cavity 74 is distributed separately to each small hole 75 after the gaseous fuel F and the compressed air A2 are further mixed together, and the mixture is spouted out to the combustion chamber 5. Similarly to the second embodiment, the flow rate distribution of the gaseous fuel F to be spouted out from each of the fuel nozzles 21 and the small holes 75 can be controlled by changing the flow-passage-area ratio of the fuel nozzles 21 and the small holes 75 (or the fuel flow passage 77). The present embodiment is similar to the second embodiment also in that the fuel-air ratio of the mixture to be spouted out from the small holes 75 near the inner area 71 is set such that it is not a ratio within the flammability range.

In other respects than those explained above, the present embodiment is similar to the first embodiment.

—Effects—

In the present embodiment, the mixture spouted out from the small holes 75 to the combustion chamber 5 blows away particulate matters to suppress adhesion of the particulate matters to the burner 8. Thereby, in the present embodiment also, the effect (1) can be attained similarly to the first embodiment. In addition, the effect (3) can also be attained similarly to the first embodiment because the configuration of the small holes 75 is the same as that in the first embodiment.

Fourth Embodiment

—Configuration—

Figure 10:
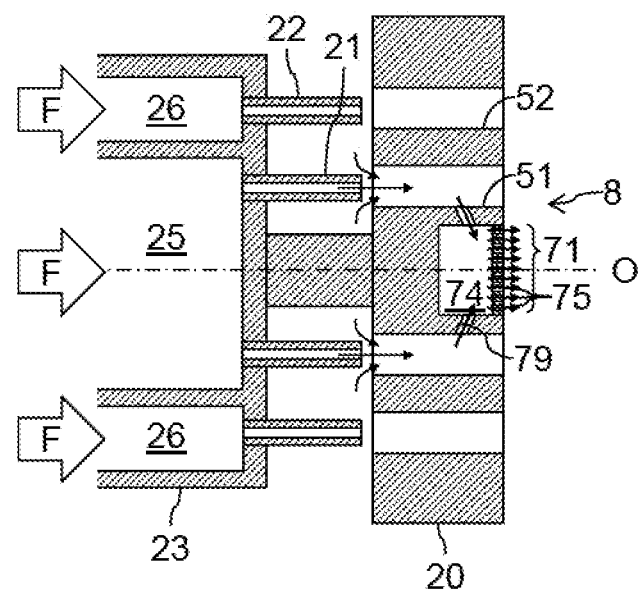
FIG. 10 is a cross-sectional view that represents the configuration of main sections of a burner provided to the gas turbine combustor according to a fourth embodiment of the present invention, and includes the central axis of the burner.

FIG. 10 is a cross-sectional view that represents the configuration of main sections of the burner provided to the gas turbine combustor according to a fourth embodiment of the present invention, and includes the central axis of the burner. FIG. 10 corresponds to FIG. 2 illustrating the first embodiment. Elements in FIG. 10 that are similar to their counterparts in the first embodiment are given the same reference signs as those in FIG. 2, and explanation thereof is omitted.

The present embodiment is different from the first embodiment in that bypass holes 79 branching off from the innermost air holes 51 are connected to the plurality of small holes. The bypass holes 79 have inlets that are opened through the inner-wall surfaces of the air holes 51. The bypass holes 79 pass inside the air hole plate 20, and are connected to the cavity 74. There is at least one bypass hole 79 connecting at least one air hole 51 to the cavity 74. The air flow passages 72 and 73 of the first embodiment are not included in the present embodiment, and, other than the small holes 75, only at least one bypass hole 79 is connected to the cavity 74. Thereby, the mixture is guided to the cavity 74 from the air holes 51 via the bypass holes 79. The mixture having been introduced into the cavity 74 is distributed separately to each small hole 75 after the gaseous fuel F and the compressed air A2 are further mixed together, and the mixture is spouted out to the combustion chamber 5. Note that the flow rate distribution of the mixture to be spouted out from the small holes 75 and the air holes 51 can be controlled by changing the flow-passage-area ratio of the air holes 51 and the bypass holes 79 because the mixture to be spouted out from the small holes 75 is a part of the mixture to be spouted out from the air holes 51. The flow-passage-area ratio is limited such that the fuel-air ratio of the mixture to be spouted out from the small holes 75 near the inner area 71 is not a ratio within the flammability range.

In other respects than those explained above, the present embodiment is similar to the first embodiment.

—Effects—

In the present embodiment, the mixture spouted out from the small holes 75 to the combustion chamber 5 blows away particulate matters to suppress adhesion of the particulate matters to the burner 8. Thereby, in the present embodiment also, the effect (1) can be attained similarly to the first embodiment. In addition, the effect (3) can also be attained similarly to the first embodiment because the configuration of the small holes 75 is the same as that in the first embodiment.

Fifth Embodiment

—Configuration—

Figure 11:
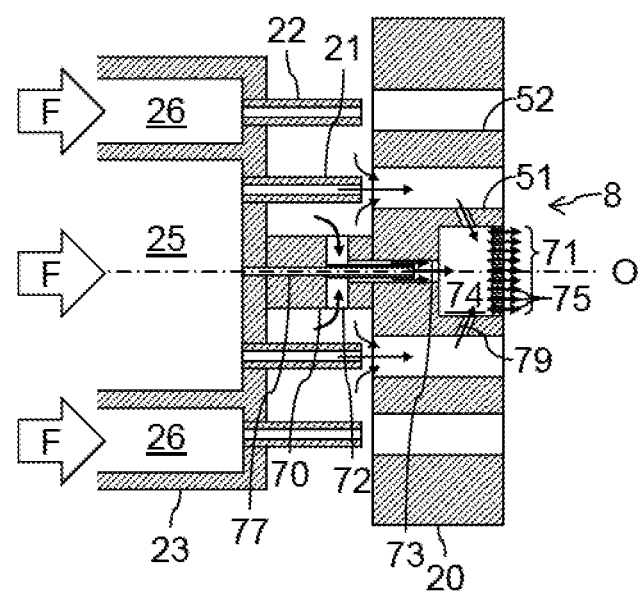
FIG. 11 is a cross-sectional view that represents the configuration of main sections of a burner provided to the gas turbine combustor according to a fifth embodiment of the present invention, and includes the central axis of the burner.

FIG. 11 is a cross-sectional view that represents the configuration of main sections of the burner provided to the gas turbine combustor according to a fifth embodiment of the present invention, and includes the central axis of the burner. FIG. 11 corresponds to FIG. 2 illustrating the first embodiment. Elements in FIG. 11 that are similar to their counterparts in the first embodiment are given the same reference signs as those in FIG. 2, and explanation thereof is omitted.

The present embodiment is different from the first embodiment in that the fuel flow passage 77 of the third embodiment and the bypass holes 79 of the fourth embodiment are added. Accordingly, in the present embodiment, a part of the gaseous fuel F is guided to the air flow passage 73 from the fuel cavity 25 via the fuel flow passage 77, and a mixture of the gaseous fuel F and the compressed air A2 is guided to the cavity 74 via the air flow passage 73. Additionally, the mixture is guided to the cavity 74 from the air holes 51 via the bypass holes 79. The mixtures having been introduced into the cavity 74 is distributed separately to each small hole 75 after the gaseous fuel F and the compressed air A2 are further mixed together, and the mixture is spouted out to the combustion chamber 5. The flow rates and the like of the mixtures can be controlled in manners similar to those in the third embodiment and the fourth embodiment.

In other respects than those explained above, the present embodiment is similar to the first embodiment. Note that, in the example case explained in the present embodiment, the fuel flow passage 77 and the bypass holes 79 are added to the configuration of the first embodiment (a combination of the third embodiment and the fourth embodiment). However, this is not the only combination of embodiments, but it is also possible to realize a configuration from which the fuel flow passage 77 is omitted (a combination of the first embodiment and the fourth embodiment) in the present embodiment, for example. In addition, it is also possible to realize a configuration from which the air flow passages 72 and 73 are omitted (a combination of the second embodiment and the fourth embodiment) in the present embodiment.

—Effects—

The effects (1) and (3) can be attained in the present embodiment also.

Sixth Embodiment

—Configuration—

Figure 12:
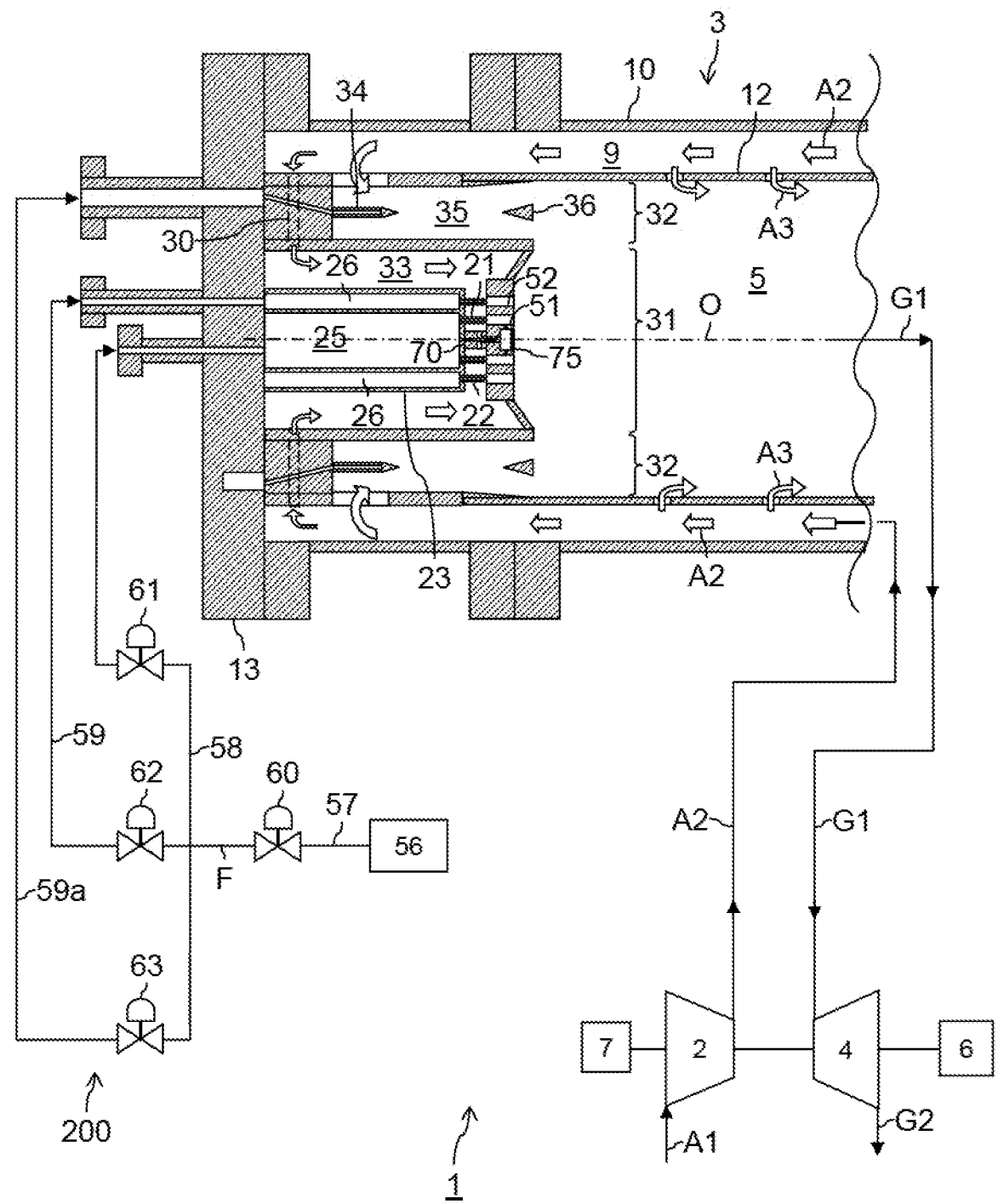
FIG. 12 is a schematic configuration diagram of the gas turbine power plant including the gas turbine combustor according to a sixth embodiment of the present invention.

FIG. 12 is a schematic configuration diagram of the gas turbine power plant including the gas turbine combustor according to a sixth embodiment of the present invention. FIG. 12 corresponds to FIG. 1 illustrating the first embodiment. Elements in FIG. 12 that are similar to their counterparts in the first embodiment are given the same reference signs as those in FIG. 1, and explanation thereof is omitted.

The structure of the combustor according to the sixth example is illustrated in FIG. 12. The present embodiment is different from the first embodiment in that the combustor 3 includes a multi burner including a plurality of burners. The combustor 3 according to the present embodiment includes a single pilot burner 31, and main burners 32 arranged to surround the circumference of the pilot burner 31. Although the present invention is applied to the pilot burner 31 in the example of the present embodiment, and a burner of the same type as that in the fifth embodiment (FIG. 11) is applied as the pilot burner 31 in the example illustrated in FIG. 12, any of the burners according to the first to fifth embodiments can be applied as the pilot burner 31. The air holes 51 and 52 and small holes 75 of the pilot burner 31 are supplied with the compressed air A2 via pilot burner air introducing holes 30 provided through the nozzle bases of the main burners 32, and pilot burner air flow passages 33 provided around the circumference of the fuel distributor 23.

Various burners can be adopted for the main burners 32. The main burners 32 of the present embodiment are premixture burners including main-burner fuel nozzles 34, main-burner premixing passages 35 and annular flame holders 36. The main-burner fuel nozzles 34 are supplied with the gaseous fuel F via a branch pipeline 59a branching off from the main flow pipeline 57 downstream of the fuel shut valve 60. A fuel flow control valve 63 is provided on the branch pipeline 59a. The flow rate of a fuel supplied to the main-burner fuel nozzles 34 can be controlled with the fuel flow control valve 63, and the fuel supply can also be shut off. The gaseous fuel F having been injected from the main-burner fuel nozzles 34 is mixed with the compressed air A2 in the main-burner premixing passages 35, and forms a premixture. The premixture is spouted out from the main-burner premixing passages 35 to the combustion chamber 5, and forms flames. The annular flame holders 36 stabilize the flames formed by the premixture spouted out from the main-burner premixing passages 35.

In other respects than that the main burners 32 of another combustion method are arranged around the circumference of the pilot burner 31 in the manner mentioned above, the present embodiment is similar to the first embodiment.

—Effects—

As described above, the burner of the present invention can be combined with various burners. By applying lean combustion that can provide good combustion stability to the pilot burner 31 positioned at the center of the combustor 3, and adopting premixture burners for the main burners 32 as in the present embodiment, a high-capacity gas turbine that can provide good combustion stability and reduced NOx emissions can be constructed. By applying a burner of any of the embodiments mentioned above to the pilot burner 31 at that time, adhesion of particulate matters to the burner can be suppressed, and the structural reliability can be improved.

Seventh Embodiment

—Configuration—

Figure 13:
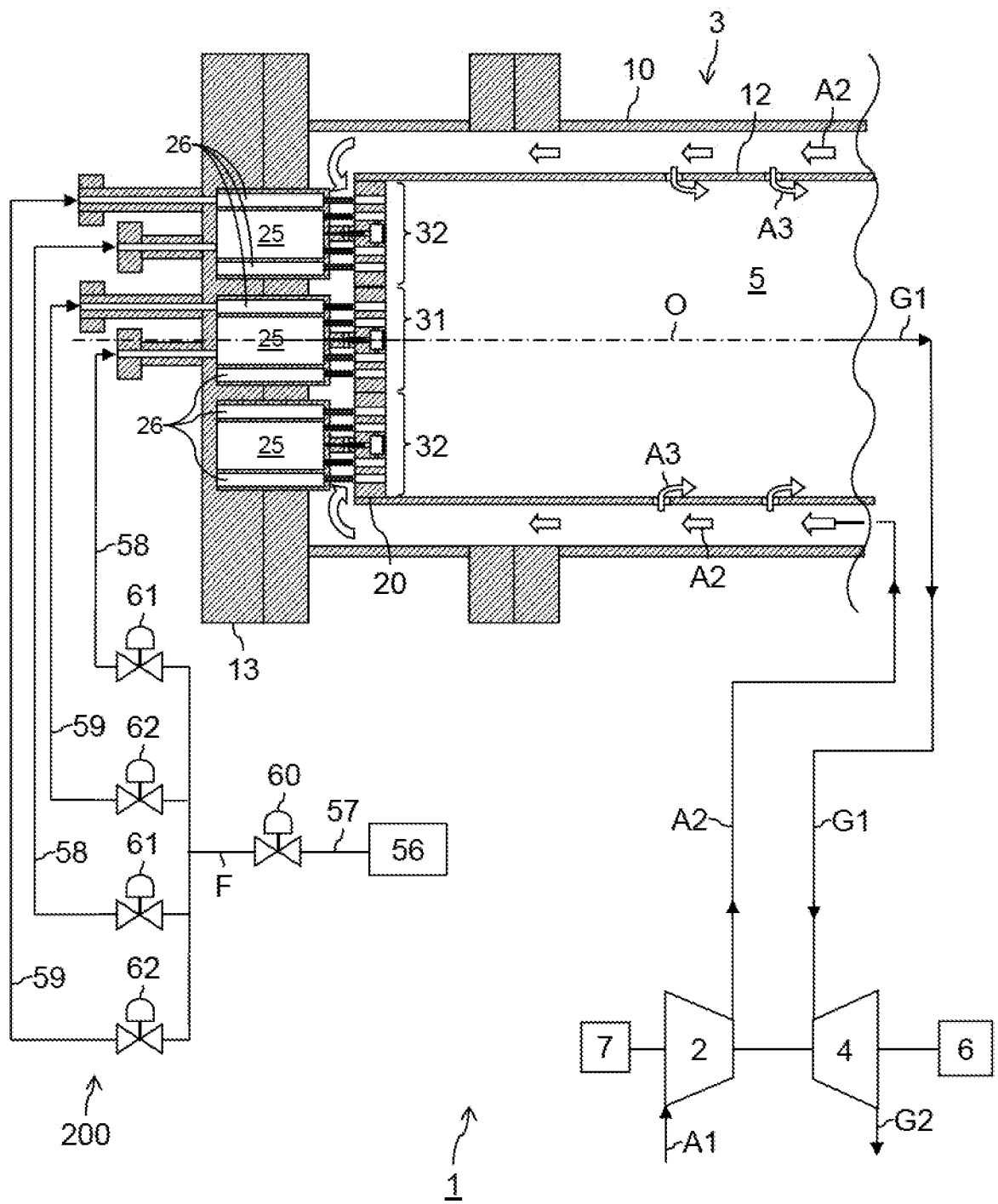
FIG. 13 is a schematic configuration diagram of the gas turbine power plant including the gas turbine combustor according to a seventh embodiment of the present invention.
Figure 14:
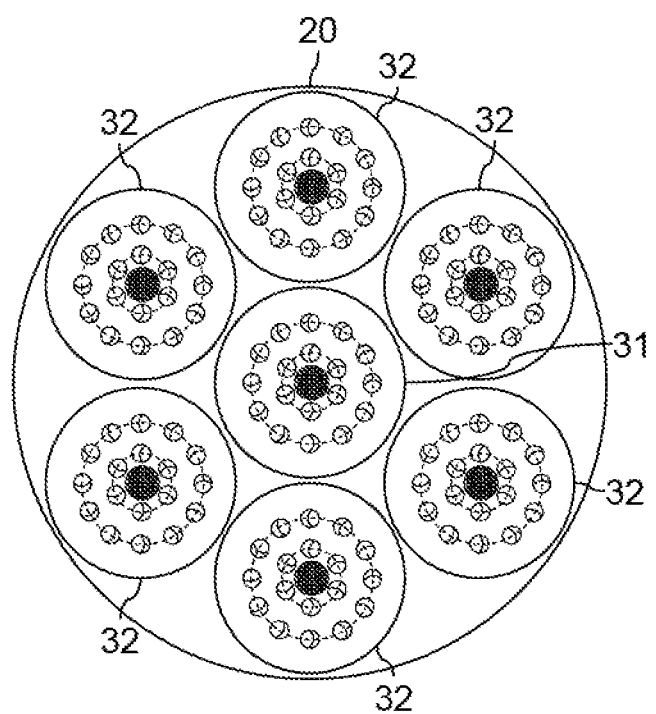
FIG. 14 is a figure of the burner provided to the gas turbine combustor according to the seventh embodiment of the present invention as seen from the combustion chamber.

FIG. 13 is a schematic configuration diagram of the gas turbine power plant including the gas turbine combustor according to a seventh embodiment of the present invention, and FIG. 14 is a figure of the burner provided to the gas turbine combustor according to the present embodiment as seen from the combustion chamber. FIG. 13 and FIG. 14 correspond to FIG. 1 and FIG. 3 illustrating the first embodiment. Elements in FIG. 13 and FIG. 14 that are similar to their counterparts in the first embodiment are given the same reference signs as those in FIG. 1 and FIG. 3, and explanation thereof is omitted.

The present embodiment is different from the first embodiment in that the combustor 3 includes a multi burner including a plurality of burners in the same manner as that in the sixth embodiment. It should be noted however that the present invention is applied not only to the pilot burner 31, but also to a plurality of the main burners 32 (six main burners 32 in the present example) arranged around the circumference of the pilot burner 31 in the present embodiment. Any of the burners according to the first to fifth embodiments can also be applied as the pilot burner 31 and the individual main burners 32. For example, all of the pilot burner 31 and the main burners 32 are uniformly any one of the burners that is selected from the first to fifth embodiments in a possible configuration, and multiple types of burners that are selected from the first to fifth embodiments are mixedly present in another possible configuration. The air hole plate 20 can be shared by the pilot burner 31 and the plurality of main burners 32 (the air holes 51 and 52 for the individual burners can be formed through the one air hole plate 20).

In the fuel supplying system 200, the number of the sets of the branch pipelines 58 and 59 that branch off from the main flow pipeline 57 is equal to the total number (seven in the present example) of the pilot burner 31 and main burners 32, and the branch pipelines 58 and 59 are connected to the fuel cavities 25 and 26 of corresponding burners. The main burners 32 may be configured such that at least two burners share a fuel supplying system (the branch pipeline 59 and the fuel flow control valve 62). Similar to the first to sixth embodiments, the main flow pipeline 57, and the branch pipelines 58 and 59 are provided with the fuel shut valve 60, and the fuel flow control valves 61 and 62, respectively.

In other respects than those explained above, the present embodiment is similar to the first embodiment.

—Effects—

By applying burner configurations selected as desired from the first to fifth embodiments to the pilot burner 31 and the main burners 32, and configuring a multi burner, it is possible to cope with a high-capacity gas turbine while effects similar to those in the selected embodiments are attained.

What is claimed is:

1. A gas turbine combustor comprising:
   a tubular liner that forms a combustion chamber; and
   a burner including
   an air hole plate that is arranged at an inlet of the tubular liner, and includes a plurality of air holes for guiding compressed air to the combustion chamber, and
   a plurality of fuel nozzles that are arranged on a side opposite to the combustion chamber with the air hole plate being sandwiched therebetween, the plurality of fuel nozzles each injecting a fuel toward a corresponding air hole, the air holes and the plurality of fuel nozzles forming a plurality of concentric annular lines, wherein a plurality of small holes having opening diameters smaller than opening diameters of the plurality of of air holes are provided through the air hole plate such that the plurality of small holes are positioned in an inner area of an innermost annular line of the plurality of air holes, the plurality of small holes are opened through a surface facing the combustion chamber of the air hole plate, and the plurality of small holes are provided densely in an inner area of the innermost annular row of air holes than in an outer area of the innermost annular row of air holes in the burner.

2. The gas turbine combustor according to claim 1, comprising:

an air flow passage connected to the plurality of small holes.

3. The gas turbine combustor according to claim 1, comprising:

a fuel flow passage connected to the plurality of small holes.

4. The gas turbine combustor according to claim 3, further comprising:

an air flow passage connected to the plurality of small holes.

5. The gas turbine combustor according to claim 4, wherein a bypass hole branching off from the air holes is connected to the plurality of small holes.

6. The gas turbine combustor according to claim 1, comprising the burner as a pilot burner, further comprising:

a plurality of main burners arranged so as to surround a circumference of the pilot burner.

7. The gas turbine combustor according to claim 6, comprising:

a plurality of the burners as the pilot burner and the plurality of main burners arranged to surround the circumference of the pilot burner.

\* \* \* \* \*